UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

OCTENEDIONES.

991,735.     Specification of Letters Patent.     Patented May 9, 1911.

No Drawing.     Application filed June 28, 1910. Serial No. 569,331.

*To all whom it may concern:*

Be it known that we, GEORG MERLING, professor of chemistry, doctor of philosophy, and HUGO KÖHLER, doctor of philosophy, citizens of the German Empire, residing at Elberfeld, Germany, have invented new and useful Improvements in Octenediones, of which the following is a specification.

The present invention relates to the manufacture and production of the hitherto unknown octenediones which are derivatives of the 1.5-diketones of the formula:

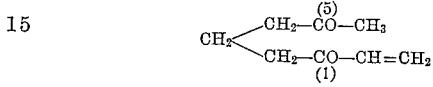

These 1.5-octenediones are distinguished from the 1.3-octenediones of the formula:

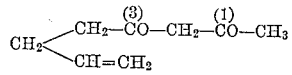

by the formation of normal oxims with hydroxylamin, with which the 1.3-diketones form iso-azoles. These substances show the further difference that the 1.3-diketones form cyclic ketones on contact with conc. sulfuric acid, while the 1.5-diketones do not form such ketones. The process for their production consists in heating methylene ketones or allowing them to stand for some time or by treating octadionol or its homologues with dehydrating agents. On starting *e. g.* from methyleneethylmethylketone the unsaturated 1.5-diketone (dimethyloctenedione)

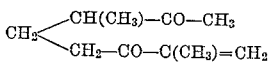

is obtained.

The new bodies are valuable intermediate compounds for producing pharmaceutical products or other technically valuable products. They are limpid oils soluble in ether, alcohol and benzene.

In order to illustrate the new process more fully the following examples are given, the parts being by weight:

Example 1: Methyleneethylmethylketone is distilled several times. An oil of a higher boiling point is thus obtained which consists for the most part of dimethyloctenedione. By fractional distillation *in vacuo* dimethyloctenedione is obtained in the shape of a colorless refracting oil soluble in water and possessing an odor like pinene. Its formation probably takes place according to the following equation:

$CH_2=C(CH_3)-CO-CH_3+CH_3-CO-C(CH_3)=$

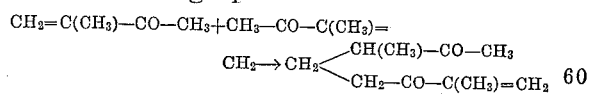

It boils at from 83–85° C. under a pressure of 17 mm. Its semicarbazone melts at 183° C. and is scarcely soluble in alcohol. Dimethyloctenedione decolorizes permanganate. By distillation at the ordinary temperature it depolymerizes slowly, methyleneethylmethylketone being obtained.

Example 2: In a vessel provided with a reflux condenser methylene acetone is heated to boiling for 2–3 days. The mass of the reaction slowly thickens while the boiling point rises from 80 up to 85° C. By a fractional distillation *in vacuo* octenedione is separated from the mixture. Its formation probably takes place according to the following formula:

$CH_2=CH.CO-CH_3+CH_3-CO-CH=$

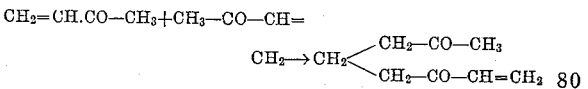

It is a limpid oil easily soluble in water. Boiling point 75–76° C. under a pressure of 21 mm. Its semicarbazone melts at 199° C.

We claim:—

1. The herein described 1.5 octenediones obtainable from methylene-ketones, which compounds are limpid oils soluble in ether, alcohol and benzene forming normal oxims with hydroxylamin, substantially as described.

2. The herein described dimethyloctenedione obtainable from methyleneethylmethylketone, which product is a limpid oil soluble in water and boiling at 83–85° C. under a pressure of 17 mm., its semicarbazone melting at 183° C., substantially as described.

In testimony whereof we have hereunto set our hands in the presence of two subscribing witnesses.

GEORG MERLING. [L. S.]
    HUGO KÖHLER. [L. S.]

Witnesses:
    WALTER VONNEGUT,
    ALFRED HENKEL.

Copies of this patent may be obtained for five cents each, by addressing the "Commissioner of Patents, Washington, D. C."

It is hereby certified that in Letters Patent No. 991,735, granted May 9, 1911, upon the application of Georg Merling and Hugo Köhler, of Elberfeld, Germany, for an improvement in "Octenediones," an error appears in the printed specification requiring correction as follows: Lines 60 and 80, that portion of the formula reading "$CH_2 \rightarrow CH_2$" should read $CH_2 = CH_2$; and that the said Letters Patent should be read with this correction therein that the same may conform to the record of the case in the Patent Office.

Signed and sealed this 25th day of July, A. D., 1911.

[SEAL.]

E. B. MOORE,
*Commissioner of Patents.*